(12) United States Patent
Whiteman et al.

(10) Patent No.: US 8,141,908 B2
(45) Date of Patent: Mar. 27, 2012

(54) SECURITY DEVICE AND METHOD

(75) Inventors: Robert Whiteman, Reading (GB); Adam Jeacock, Southampton (GB)

(73) Assignee: De La Rue International Limited, Hampshire (GB)

( * ) Notice: Subject to any disclaimer, the term of this patent is extended or adjusted under 35 U.S.C. 154(b) by 167 days.

(21) Appl. No.: 12/451,732

(22) PCT Filed: Jun. 12, 2008

(86) PCT No.: PCT/GB2008/002021
§ 371 (c)(1),
(2), (4) Date: Feb. 16, 2010

(87) PCT Pub. No.: WO2009/010714
PCT Pub. Date: Jan. 22, 2009

(65) Prior Publication Data
US 2010/0164219 A1    Jul. 1, 2010

(30) Foreign Application Priority Data
Jul. 19, 2007    (GB) .................................. 0714141.9

(51) Int. Cl.
*B42D 15/00* (2006.01)
*B44F 1/10* (2006.01)
(52) U.S. Cl. .............................. 283/114; 283/91; 428/29
(58) Field of Classification Search .................... 283/94, 283/114, 91; 428/29
See application file for complete search history.

(56) References Cited

U.S. PATENT DOCUMENTS

| 4,652,015 | A |   | 3/1987 | Crane |
| 5,851,032 | A | * | 12/1998 | Green .............................. 283/91 |
| 5,855,989 | A | * | 1/1999 | Mantegazza .................... 283/74 |
| 6,089,614 | A | * | 7/2000 | Howland et al. .............. 283/114 |
| 7,316,422 | B1 | * | 1/2008 | Schmitz .......................... 283/72 |
| 2008/0143095 | A1 | * | 6/2008 | Isherwood et al. ............. 283/72 |
| 2009/0045618 | A1 | * | 2/2009 | Williams et al. ................ 283/94 |

(Continued)

FOREIGN PATENT DOCUMENTS
DE    32 08 004 A1    9/1982
(Continued)

OTHER PUBLICATIONS

International Search Report issued in International Application No. PCT/GB2008/002021 on Nov. 24, 2008.

*Primary Examiner* — Dana Ross
*Assistant Examiner* — Kyle Grabowski
(74) *Attorney, Agent, or Firm* — Oliff & Berridge, PLC

(57) ABSTRACT

A security device comprises a substrate having a viewing region. A first pattern of a first color and a second pattern of a second color are printed on one side of the viewing region. A third pattern of the first color and a fourth pattern of the second color are printed on the other side of the viewing region. The first and second patterns on the one side of the viewing region overlap the fourth and third patterns respectively on the other side of the viewing region whereby
a) when each side of the viewing region is viewed in reflected light, the patterns on that side can be distinguished by at least their colors, and
b) when the viewing region is viewed in transmitted light, from either side of the substrate, the viewing region is sufficiently transparent that subtractive color mixing between the overlapped different colors results in a perceived single resultant color being visible.

40 Claims, 8 Drawing Sheets

U.S. PATENT DOCUMENTS

2010/0276919 A1* 11/2010 Dietemann .................... 283/74

FOREIGN PATENT DOCUMENTS

| EP | 0 388 090 A1 | 9/1990 |
| EP | 0 628 408 A1 | 12/1994 |
| EP | 0 755 799 A1 | 1/1997 |
| EP | 1 415 828 A1 | 5/2004 |
| GB | 2 282 563 A | 4/1995 |
| GB | 2 282 611 A | 4/1995 |
| GB | 2 283 026 A | 4/1995 |
| WO | WO 83/00659 A1 | 3/1983 |
| WO | WO 95/10419 A1 | 4/1995 |
| WO | WO 95/10420 A1 | 4/1995 |
| WO | WO 97/47478 A1 | 12/1997 |
| WO | WO 00/39391 A1 | 7/2000 |
| WO | WO 03/054297 A2 | 7/2003 |
| WO | WO 2004/050376 A1 | 6/2004 |

* cited by examiner

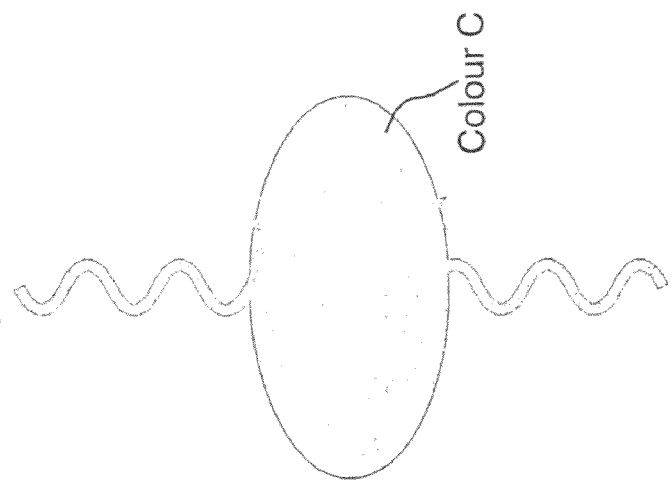
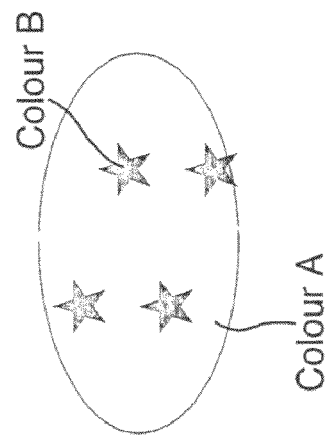
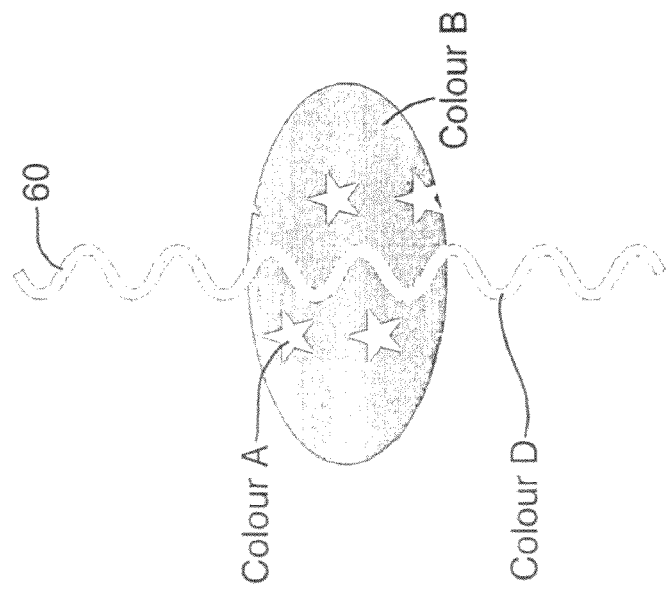

SECURITY DEVICE AND METHOD

The invention relates to a security device, for example for inclusion in or on a security document such as a document of value, and methods for its manufacture.

A variety of security devices have been proposed in the past to prevent security documents from being counterfeited or fraudulently produced. A particularly useful security device is one which is readily verifiable by a user but which is difficult to produce. An example of such a security device is a see-through feature in which complementary images are provided on each side of a document precisely registered relative to one another such that when the document is held up to the light, the image on the back will fit exactly into spaces within the image on the front. For example, each image could comprise a series of coloured segments, segments on one side of the sheet fitting within the spaces between the segments on the other. Printing of these images is normally carried out with specialised lithographic presses which allow simultaneous front and back printing during one printing run. See-through features have four modes of visual inspection—the image on the first side of the document viewed in reflected light, the image on the other side of the document viewed in reflected light, the composite image viewed by transmitted light as viewed from the first side and with the image on that side predominating, and finally the composite image as viewed on the other side of the sheet with the image on that side predominating. On transmissive viewing of see-through features the image on the opposite side of the document is seen to be in register in a genuine document.

An example of see-through features used with banknotes and the like is described in EP-A-0388090 in which the feature is provided in a region of the sheet which has a substantially uniform transparency which is more transparent than a majority of the remainder of the sheet in the absence of applied ink.

DE-A-3208004 describes the use of periodic lineal point patterns on opposite sides of a sheet which, when viewed in transmission, produce a characteristic moiré pattern indicating that the sheet is genuine.

GB-A-2282563 illustrates the use of apparently random patterns of dots at opposite sides of the sheet which, when viewed in transmission, generate a recognisable pattern.

EP-A-0628408 relates to the inclusion of a printed layer, laminated between two paper sheets, the print only being visible in transmitted light. The image may be registered to an image on one of the outer layers in a cooperative way so as to form a complete image.

EP-A-0755799 relates to a letterpress printing technique that auto-registers a fluorescent image on one side of a document to a letterpress image on the other side.

WO-A-97/47478 relates to a security device comprising a substrate having a viewing region which is provided on one side with first indicia and on the other side with second indicia overlying the first indicia. The substrate carries an obscuring material aligned with the second indicia so as to prevent the second indicia from being viewed from the one side of the substrate under reflected radiation.

EP-A-1415828 describes a security feature where patterns are aligned on the front and back surfaces of a document to provide an anti-counterfeiting security device. The document is sufficiently transparent to allow see-through of the partial image on the back of the document to be superimposed on the partial image on the front of the document to form a complete image if the patterns are properly aligned. The complete image will not be recognisable if misaligned.

Although the "see-through" features of the prior art perform satisfactorily there is always a requirement to provide improved see-through features which exhibit novel surprising effects to prevent counterfeiting.

In accordance with one aspect of the present invention, a security device comprises a substrate having a viewing region; a first pattern of a first colour and a second pattern of a second colour on one side of the viewing region; a third pattern of the first colour and a fourth pattern of the second colour on the other side of the viewing region, wherein the first and second patterns on the one side of the viewing region overlap the fourth and third patterns respectively on the other side of the viewing region whereby
  a) when each side of the viewing region is viewed in reflected light, the patterns on that side can be distinguished by at least their colours, and
  b) when the viewing region is viewed in transmitted light, the viewing region is sufficiently transparent that subtractive colour mixing between the overlapped different colours results in a perceived single resultant colour being visible.

In accordance with another aspect of the present invention, a method of manufacturing a security device comprises providing a substrate having a viewing region; printing a first pattern of a first colour and a second pattern of a second colour on one side of the viewing region, and a third pattern of the first colour and a fourth pattern of the second colour on the other side of the viewing region, wherein the first and second patterns on the one side of the viewing region overlap the fourth and third patterns respectively on the other side of the viewing region whereby
  a) when each side of the viewing region is viewed in reflected light, the patterns on that side can be distinguished by at least their colours, and
  b) when the viewing region is viewed in transmitted light, from either side of the substrate, the viewing region is sufficiently transparent that subtractive colour mixing between the overlapped different colours results in a perceived single resultant colour being visible.

We have developed a new type of see-through feature which exploits subtractive colour mixing. When the device is viewed in reflection on either side, the contrast between the two colours enables the two patterns on that side to be distinguished. However, when the device is viewed in transmission, the overlapping, different colours subtract respective wavelengths or wavelength bands from the incident light such that the resultant light transmitted through both sets of overlapping patterns has substantially the same colour and thus it is no longer possible to distinguish between the individual patterns. The advantage of this security device is that it is easy to inspect but difficult to fabricate.

Although the first-to-fourth patterns could all be different in shape and/or layout, preferably the third pattern is in register with and superimposes the second pattern, and the fourth pattern is in register with and superimposes the first pattern. This has the advantage that in transmission the four patterns cause a flat, resultant colour to be visible throughout the viewing region but also the appearance of each side of the viewing region in reflection is similar.

In preferred examples, the first to fourth patterns are in the form of indicia such as an identifying image but more generally may comprise one or more of line patterns, fine filigree line patterns, dot structures, geometric patterns, alphanumeric characters, symbols or other indicia and the like. Each pair of patterns may form indicia independently or cooperate to form indicia.

In other examples, the patterns define pseudo-random arrays of pixels in the respective colours. In this case, the existence of a security feature is less obvious when the viewing region is viewed in reflection.

In either case, the single resultant colour seen in transmission may be formed into an image shape such as an indicia, symbol, alphanumeric character or the like.

The patterns may define continuous blocks of the respective colours or discontinuous regions.

Where indicia or alphanumeric characters are defined, these may include those from non-Roman scripts of which examples include but are not limited to, Chinese, Japanese, Sanskrit and Arabic. Typically the indicia will be visible when illuminated by visible light but in a further example the indicia will respond visibly to invisible radiation such as infrared or ultraviolet.

Typically, the patterns are printed onto the substrate. Any of the patterns could be printed using lithography, UV cured lithography, intaglio, letterpress, flexographic printing, gravure printing or screen-printing. Preferably the patterns printed on the front and back of the substrate are printed simultaneously. The patterns can be provided using conventional inks such as coloured inks, white inks, black inks, metallic inks, optically variable inks (such as those incorporating thin film optical interference filters or liquid crystal pigment) and the like. Thermochromic inks, photochromic inks, magnetic inks, infrared absorbing inks and fluorescing and phosphorescing inks may also be employed.

In summary, the security device of the current invention uses subtractive colour mixing in either a localised area of the viewing region or across the whole viewing region in a novel way to producing striking effects which are memorable to the authenticator. Whereas traditional see-through features may have more than one colour on either side of the viewing area such that in transmission multiple subtractively mixed colours are observed, the preferred embodiments of the current invention have the same two colours on either side in substantially perfect register such that only one single colour is observed in transmission. The optical effect of going from two colours in reflection to just one colour in transmission is unexpected and therefore striking and memorable to the viewer. The striking nature of this optical effect is enhanced further if the switch from two colours in reflection to just one substantially uniform colour in transmission is associated with the disappearance of a recognisable image.

Furthermore the requirement that at least in some areas of the viewing region the patterns on either side of the substrate are in substantially perfect register, in order to go from two colours in reflection to one colour in transmission, provides a challenging registrational requirement that is difficult for the counterfeiter to achieve. Although the level of registration produces a complex device which is difficult to copy, the security device itself is easy to verify because the authenticator simply has to check the presence of one single colour either across the whole viewing region or in specific easily identifiable localised areas. This is not the case for a conventional see-through feature with two or more colours on either side of the substrate where any mis-registration can be hidden in the complexity of the multicolour transmissive image.

The substrate in the viewing region may be the same substrate as that of the secure document it is protecting, for example the security feature of the current invention may be applied by printing the patterns on either side of a traditional banknote paper substrate. In transmission the substrate should be sufficiently transparent to allow the result of the subtractive colour mixing of the colours of the first and second indicia to be observed. It is not necessary that the opacity of the substrate prevents the colour of the third and fourth patterns being observed when the device is viewed in reflection from the side of the first and second patterns as this is achieved through the opacity of the inks used to form the patterns or the use of an additional obscuring layer.

The substrate may be more transparent in the viewing region than elsewhere. In the case of a solely paper substrate the area of greater transparency will be formed typically during the manufacture of the substrate as described in GB-A-2282611 and GB-A-2283026.

Alternatively the substrate comprises a substantially transparent viewing region comprising a polymeric material. Techniques are known in the art for forming transparent regions in both paper and polymeric substrates. For example, WO-A-8300659 describes a polymer banknote formed from a transparent substrate comprising an opacifying coating on both sides of the substrate. The opacifying coating is omitted in localised regions on both sides of the substrate to form a transparent region.

WO-A-0039391 describes a method of making a transparent polymeric region in a paper substrate.

Other methods for forming transparent regions in paper substrates are described in EP-A-723501, EP-A-724519 and WO-A-03054297.

In the case where the viewing region is formed from a different material than the document substrate, the patterns can be applied to the viewing region either before or after the material forming the viewing region is incorporated into the substrate. Preferably, the patterns are applied after the material forming the viewing region is incorporated into the substrate and using the same conventional printing processes that are used to print the substrate. This also enables the patterns to be exactly registered with other indicia on the substrate.

Examples of security documents with which the present invention can be used include banknotes, fiscal stamps, cheques, postal stamps, certificates of authenticity, articles used for brand protection, bonds, payment vouchers, and the like.

Some examples of security devices located on or in security documents according to the invention will now be described with reference to the accompanying drawings, in which:

FIGS. 8a-8c are views similar to FIGS. 1a-1c but of an eighth example; and,

Figure 1A:
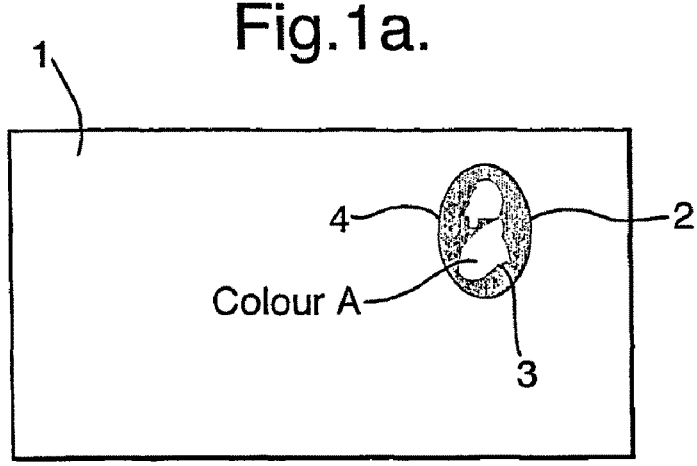
FIGS. 1a-1c are schematic, plan views of a security document for carrying a first example of a security device according to the invention when viewed in reflection from opposite sides and in transmission respectively.

The security document shown in FIG. 1 comprises a substrate 1 which may be paper or polymer, in this case paper.

The substrate defines front and rear sides and has a substantially transparent viewing region 2. The substantially transparent viewing region 2 may have been formed using any of the conventional methods cited above. On the front side of the viewing region 2 (FIG. 1a) first and second patterns 3,4 are printed in colours A and B respectively to define first indicia. In this example colour A is magenta (for example standard lithographic printing ink "Pantone® Process Magenta U" can be used) and colour B is cyan (for example standard lithographic printing ink "Pantone® Process Cyan U" can be used). The patterns are in the form of a company logo 3 with colour A (magenta) forming the portrait on the front side of the viewing region and colour B (cyan) forming the background area 4. On the rear side of the viewing region 2 third and fourth patterns 5,6 are printed using the same colours A and B to form second indicia. The second indicia is the same as the first indicia apart from the fact that the colours are now reversed such that colour B (cyan) now forms the portrait 6 ("fourth pattern") and colour A (magenta) forms the background region 5 ("third pattern"). The first and second indicia are applied in substantially perfect register such that the first pattern 3 is directly superimposed on the fourth pattern 6 while the second pattern 4 is directly superimposed on the third pattern 5. Preferably the first and second indicia are printed simultaneously on the front and rear side of the viewing region 2 using lithographic printing.

Figure 1B:
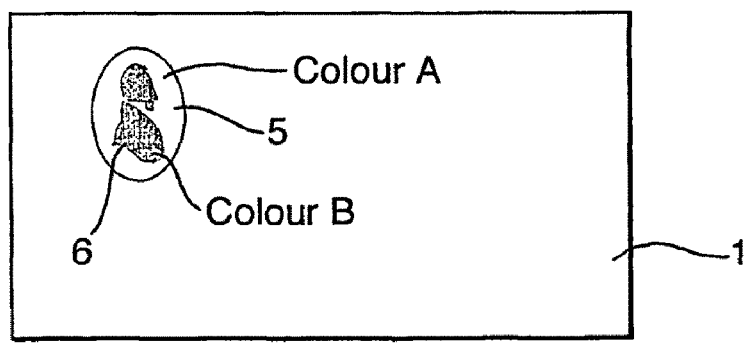
Figure 1C:
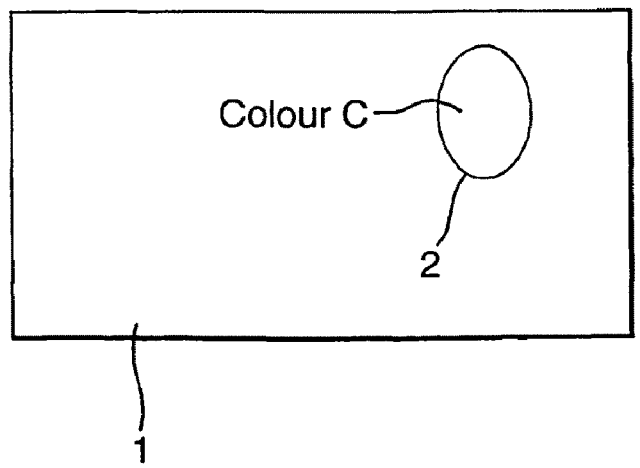

The optical properties of the inks used to form the first and second indicia are selected such that when viewing the device in reflection from the front of the substrate the colours of the first indicia substantially conceals the colours of the second indicia such that a magenta portrait is observed on a cyan background (FIG. 1a). Likewise when viewing the device in reflection from the rear of the substrate the colours of the second indicia substantially conceals the colours of the first indicia such that a cyan portrait is observed on a magenta background (FIG. 1b). When viewing the device in transmission, from either side of the device, the coloured printed inks allow sufficient light transfer that a combined colour is observed as a result of the subtractive colour mixing of colours A and B. In this example both the portrait and the background will appear blue, resulting from the combination of cyan and magenta, and in this manner the identifying image disappears when viewing in transmission and is replaced with a perceived single colour region. (FIG. 1c).

The embodiment illustrated in FIG. 1, in which an image disappears or vanishes when the device is viewed in transmission, highlights the advantages of the current invention over conventional see-through features. Firstly any errors in registration are far more apparent because any mis-registration results in obvious halos or darker areas that present an outline of the mismatched indicia. In conventional see-through devices, where an image appears in transmission rather than disappearing, the resultant image is far more tolerant of small imperfections since the eye is looking to perceive a composite image, where small irregularities or mismatches are more easily overlooked in the general appreciation of the overall image. In contrast, with the current invention the authenticator verifies the document by checking the image is no longer present, and any mismatch is immediately obviously, rather than being a subtly of a larger dominant image.

The registration requirements of the current invention also has a further tolerance constraint beyond conventional see-through devices, since generally it not only requires substantially perfect front to back registration, but also substantially perfect interlocking registration between the two colours on the same side of the device. Any misregistration with regard to the colours on the same side of the device again would result in localised halos or outline of the misregistered indicia which are easily identified against the uniform background generated by the disappearing image.

The optical properties of the inks should be chosen such that when viewed in reflection the colour of the top layer of ink is the dominant colour and there is negligible effect from the colour of the underlying ink on the opposite side of the device. Furthermore the colour of the inks to form colours A and B should be chosen to provide relatively high contrast between the regions A and B when viewed in reflection.

The difference in the contrast in the two colours in reflected light can be enhanced by increasing the reflectivity of one of the colours. This can be achieved by incorporating a reflective component such as a metallic flake into one of the inks. For example if both the inks are lithographic inks the reflectivity of one of the inks could be increased by incorporating metallic flakes into the ink. Alternatively one of the inks could be a standard coloured lithographic ink and one could be a metallic lithographic ink. Alternatively both of the printed inks could be metallic inks. The use of high reflectivity inks, such as metallic inks, helps to conceal the presence of the ink on the other side of the substrate when the device is viewed in reflection.

In a further embodiment an obscuring layer is used between the two sets of indicia such that in reflection the colour on the side of the device being viewed is dominant, and the effect of the colour on the opposite side of the substrate is negligible. The use of an obscuring layer is known for conventional see-through features and is described in WO-A-9747478. The obscuring layer prevents the colour of the second indicia being observed when the device is viewed in reflection from the side of the first indicia. In transmission the obscuring layer is sufficiently transparent to allow the result of the subtractive colour mixing of the colours of the first and second indicia to be observed. A wide variety of materials could be used for the obscuring material but a good example for the present invention is the use of a vapour deposited metallic layer. For example the transparent substrate within the viewing region could be coated with a metallic material which is then partially demetallised to enable the feature to be viewed in transmitted light.

Preferably, the obscuring layer is in the form of a screen. For example, the metallised pattern could be an array of dots or lines with sufficient coverage to maintain the reflectivity but sufficiently transparent to enable colour mixing of the first and second indicia to be viewable in transmitted light. Non-linear screens are also envisaged. For example the screen could comprise a circular or sinusoidal array of dots or lines. The screen can be regular or stochastic. Indeed, the term "screen" should be construed broadly to encompass many different shapes of screen elements.

Preferably, the coverage of the screen pattern is in the range 20-80%, and more preferably in the range 40-70% and even more preferably in the range 50-70%. The width of the lines or the diameter of the dots forming the screen are preferably in the range 50-250 µm and the spaces between the dots or lines are also in the range 50-250 µm with values of each set chosen to achieve the desired screen coverage.

The metallised pattern could be an array of dots or lines with sufficient coverage to maintain the reflectivity but sufficiently transparent to enable colour mixing of the first and second indicia to be viewable in transmitted light. This is particularly appropriate with a polymeric substrate. Alternatively, the substrate could be coated with a very thin film of aluminium, metal oxide or other reflective layer such that again it exhibits both high reflectivity and sufficient transparency. As an alternative to a vapour deposited metallic layer the obscuring layer could be formed by a printed metallic ink.

Alternatively the obscuring layer can comprise a masking coat. Examples of such a masking coat would be Coates 3188XSN or Coates Heliovyl White S90 353. A typical coat weight is suggested to be in the region of 1-3GSM. These masking coats are already commonly used in banknote security threads to conceal information in reflected light.

Figure 2:
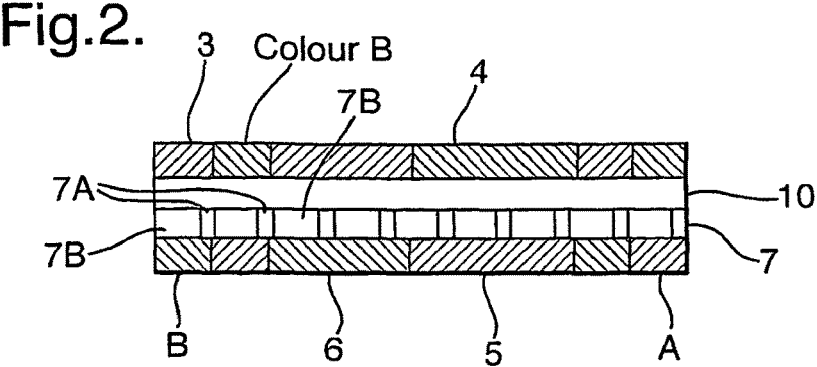
FIG. 2 is a cross-section through a second example of a security device incorporating an obscuring layer.

FIG. 2 illustrates the use of an obscuring layer. In FIG. 2 the viewing region comprises a transparent substrate 10. On the front side of the viewing region the first and second patterns 3,4 defining the first indicia are printed in colours A and B as in the example illustrated in FIG. 1. The rear side of the substrate 10 comprises a patterned metallised film 7 which in this example is an array of closely spaced fine lines 7A separated by spaces 7B. The metallised film will typically be a metallised PET film for example MELINEX S film from DuPont, this will then be demetallised to form a screen so in the spaces there is just clear demetallised polymer film. The second indicia 5,6 is printed onto the patterned metallised film using the same colours A and B and such that every colour A element of the first indicia is perfectly registered to every colour B element of the second indicia and every colour B element of the first indicia is perfectly registered to every colour A element of the second indicia.

The width of the lines 7A and the spacing 7B between the lines of the patterned metallised film is preferably non-resolvable such that the substrate appears metallic in reflective light but appears uniformly transparent in transmissive light to enable the colour mixing of the A and B elements to be observed. The presence of the reflective obscuring layer 10 increases the brightness of the image in reflected light and ensures there is a strong contrast between the two colours A and B in reflected light by minimising the influence of the underlying colour on the opposite side of the substrate.

In a further embodiment of the current invention (FIG. 3) a third colour D, which has the same appearance in transmission as combined colour C, which is a result of the subtractive colour mixing of colours A and B, is printed on the front and/or rear side of the viewing region. This provides the device with a further level of complexity and increases the challenge to any potential counterfeiter in the form of further registrational requirements and also the requirement to match the appearance of the printed colour D to the colour C produced from the subtractive colour mixing of colours A and B.

Figure 3A:
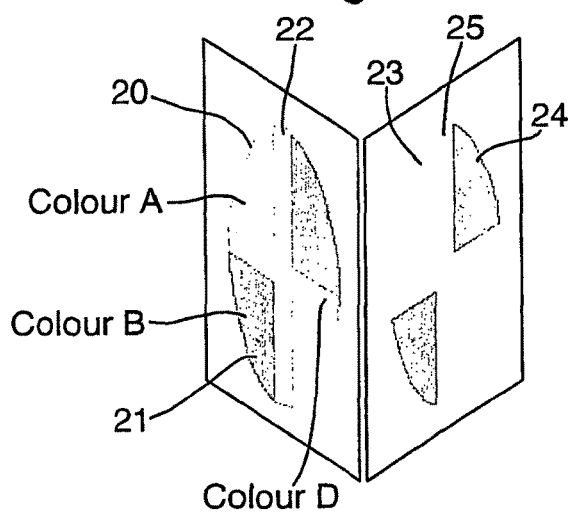
FIGS. 3a and 3b illustrate a third example of a security device according to the invention when viewed in reflection and transmission respectively.

Thus in FIG. 3*a* on the front side of the viewing region the first indicia is defined by first and second patterns 20,21 printed in colours A and B and a further pattern 22 printed in colour D to form a pictorial design. In this example colour A is magenta, colour B is cyan and colour D is blue. On the rear side of the viewing region the second indicia is defined by third and fourth patterns 23,24 printed using colours A and B. The second indicia is the same as the first indicia apart from the fact that the region 25 in alignment with pattern 22 occupied by colour D in the first indicia is now colourless. The first and second indicia are applied in substantially perfect register such that the first indicia are directly superimposed on the second indicia.

Figure 3B:
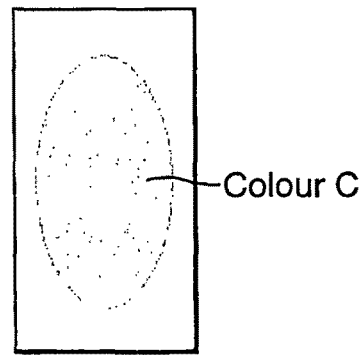

On viewing the device, illustrated in FIG. 3, in reflection (FIG. 3*a*) the authenticator will see a similar three colour image on either side of the viewing region. When viewing the device in transmitted light (FIG. 3*b*), from either side of the substrate, every region printed in colour A will combine with every region on the opposite side printed in colour B and vice versa. In this example colours A and B combine to form the colour C which is blue and has the same appearance as printed colour D when viewed in transmitted light. In this manner the multi-coloured identifying image disappears when viewing in transmitted light and is replaced with a perceived single colour region.

FIG. 4 illustrates a further example where the first and second indicia, which define the image that will ultimately disappear in transmitted light, are integrated with a further image that remains visible in both transmission and reflection. In this example the first indicia and the second indicia each comprise regions printed in colours A, B and D to form a multicolour pictorial design. As with previous examples the first indicia is applied to the front side of the document as first and second patterns 30,31 in colours A and B and a pattern in colour D 32 and the second indicia is applied to the rear side of the document as third and fourth patterns 33,34 in colours A and B and a pattern in colour D 35. As with previous examples the regions printed in colours A and B on the front and rear sides of the viewing region are superimposed with their opposite colours. In this example the region printed in colour D is split between the front 32 and rear 35 sides with corresponding colourless regions 36,37 on the other side but when combined the respective colour D elements 32,35,36,37 fit together in the same manner as a conventional see-through such that the image is the same on either side of the viewing region. A further image, in this case the number "200", is then printed on the front side of the viewing region in register with the multicolour pictorial design formed by the first and second indicia.

Figure 4A:
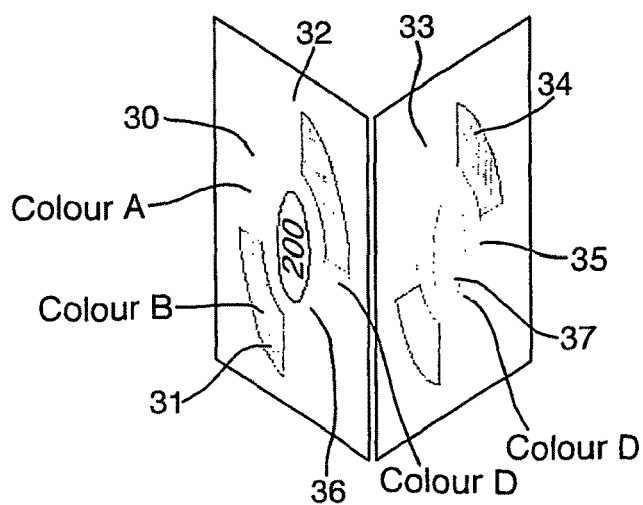
FIGS. 4a and 4b are views similar to FIGS. 3a and 3b but of a fourth example.
Figure 4B:
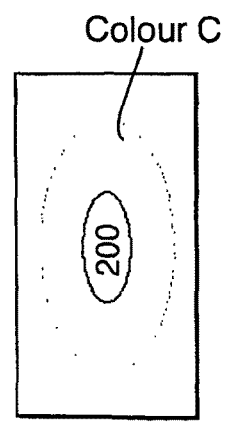

On viewing the device, illustrated in FIG. 4, in reflection (FIG. 4*a*) the authenticator will see a similar three colour image on either side of the viewing region surrounding the printed number "200". When viewing the device in transmitted light (FIG. 4*b*) the multi-coloured identifying image disappears but the image of the number "200" remains visible. The integration of the disappearing image with a permanent image not only increases the aesthetics of the device but also makes it more memorable to the general public. In the example illustrated, the disappearing image is used to draw the attention of the viewer to the permanent image that can contain important information such as the value of the protected document.

This embodiment of the invention is applicable to both paper and polymer substrates and the permanent image can be applied by printing as well as metallization or demetallisation techniques. Suitable printing techniques include lithography, UV cured lithography, intaglio, letterpress, flexographic printing, gravure printing or screen-printing. The permanent image must be sufficiently opaque to appear as a silhouette in transmitted light. The permanent image can take any form such as patterns, symbols and alphanumeric characters and combinations thereof. The indicia can be defined by patterns comprising solid or discontinuous regions which may include for example line patterns, fine filigree line patterns, dot structures and geometric patterns. Possible characters include those from non-Roman scripts of which examples include but are not limited to, Chinese, Japanese, Sanskrit and Arabic. The permanent image may be single-coloured or multi-coloured.

Figure 5A:
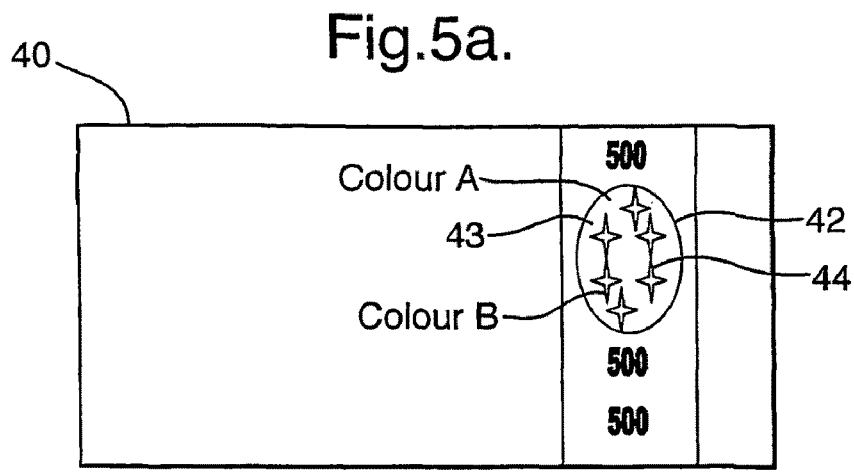
FIGS. 5a-5c are views similar to FIGS. 1a-1c but of a fifth example.
Figure 5B:
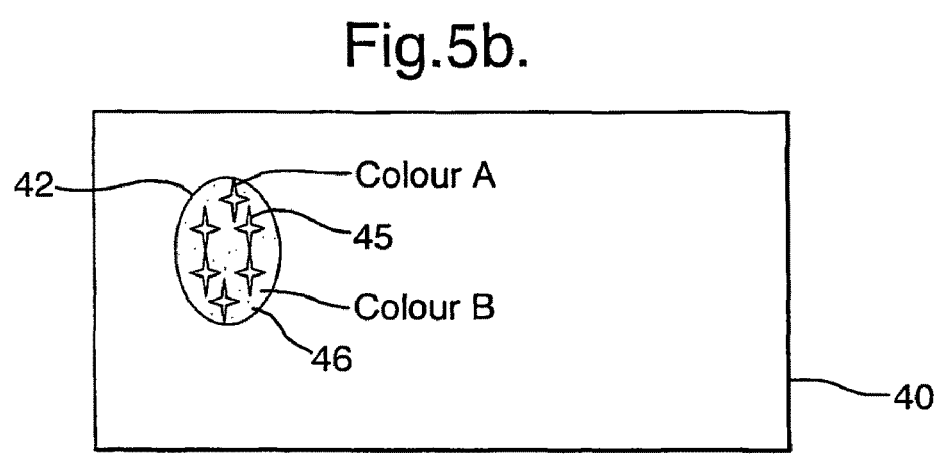

FIG. 5 illustrates an example where the security device of the current invention is incorporated into a transparent region of a paper substrate 40. A transparent elongate polymeric film 41 is incorporated into a paper substrate 40 as described in WO-A-0039391. One side of the transparent elongate polymeric film 41 is wholly exposed at one surface of a paper substrate in which it is partially embedded (FIG. 5*a*), and partially exposed in one aperture 42 at the other surface of the substrate (FIG. 5*b*). The apertures formed in the paper can be used as the viewing region in the current invention.

In this example the first and second indicia are lithographically printed onto the front (FIG. 5a) and rear side (FIG. 5b) of the viewing region respectively. The first indicia are provided as first and second patterns 43,44 (background and stars) in colours A (yellow) and B (blue) respectively while the second indicia are printed as third and fourth patterns 45,46 (stars and background) in colours A and B respectively. Thus, every colour A element of the first indicia is perfectly registered to every colour B element of the second indicia and every colour B element of the first indicia is perfectly registered to every colour A element of the second indicia. In this example the indicia form a pictorial design which is an array of stars on a coloured background.

The transparent elongate polymeric film 41 comprises a metallised image in the form of the number "500" repeating along the length of the film. It is known that metallised films can be produced such that no metal is present in controlled and clearly defined areas. Such partly metallised film can be made in a number of ways. One way is to selectively demetallise regions using a resist and etch technique such as is described in U.S. Pat. No. 4,652,015. Other techniques are known for achieving similar effects; for example it is possible to vacuum deposit aluminium through a mask or aluminium can be selectively removed from a composite strip of a plastic support and aluminium using an excimer laser.

Figure 5C:
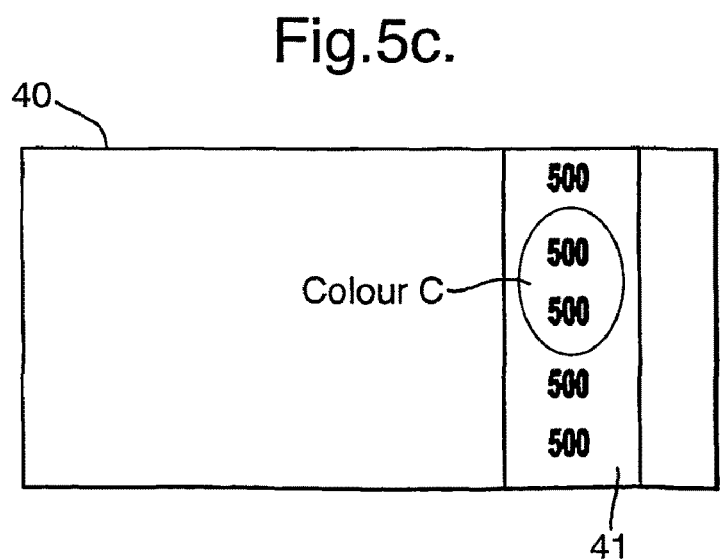

On viewing the device, illustrated in FIG. 5, in reflection (FIGS. 5a and 5b) the authenticator will observe blue stars on a yellow background on the front side and yellow stars on a blue background on the rear side. On the front side the numeral "500" is visible on the exposed polymeric film apart from in the aperture region where it is effectively concealed by the opacity of the coloured elements A and B. The numeral "500" is not visible on the rear side because the polymeric film is only exposed in the aperture region where again it is concealed by the opacity of the coloured elements A and B. When viewing the device in transmission (FIG. 5c) the multicoloured identifying image in the aperture disappears and is replaced with a substantially uniform green aperture and the numeral "500" becomes visible as a silhouette image against the substantially uniform coloured background. In this manner image 1 formed by the first and second indicia is used to conceal a permanent image 2 in reflected light which is then revealed when image 1 disappears on viewing in transmitted light.

The metallised film 41 in FIG. 5 used to produce the permanent image may also act as an obscuring layer. In this case most of the metallised film will comprise an array of closely spaced fine lines as described with reference to FIG. 2, but in the localised regions of the permanent image the metal coverage will be complete, i.e. substantially 100%, and the image will be revealed in transmitted light.

In an alternative embodiment, the metallised film will be screened, for example comprising an array of closely spaced fine lines or dots, and in localised areas will comprise a permanent image formed by the complete removal of the metal. Preferably, the areas of complete metal removal will not interfere with the visibility of the first and second patterns in transmitted light.

In the previous embodiments all of the viewing region switches from a multi-coloured image when viewed in reflection to a perceived single coloured uniform region when viewed in transmission resulting in the disappearance of the multi-coloured image. In a further embodiment only localised areas of the viewing region switches from multi-coloured to one colour, providing the disappearing effect, and other regions remain multi-coloured. This enables the switching regions to be used to reveal a perceived single colour image in transmitted light against a multi-coloured background.

Figure 6C:
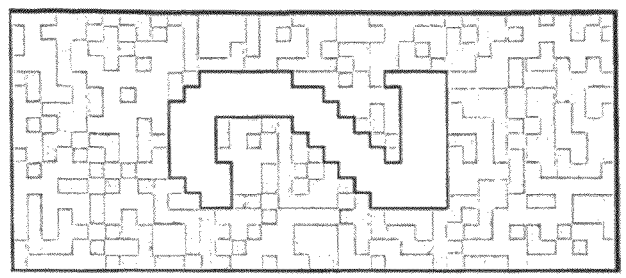
FIGS. 6a-6c are views similar to FIGS. 1a-1c but of a sixth example.
Figure 6B:
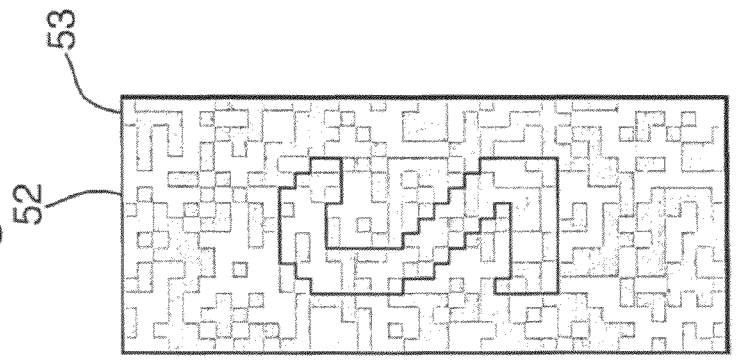
Figure 6A:
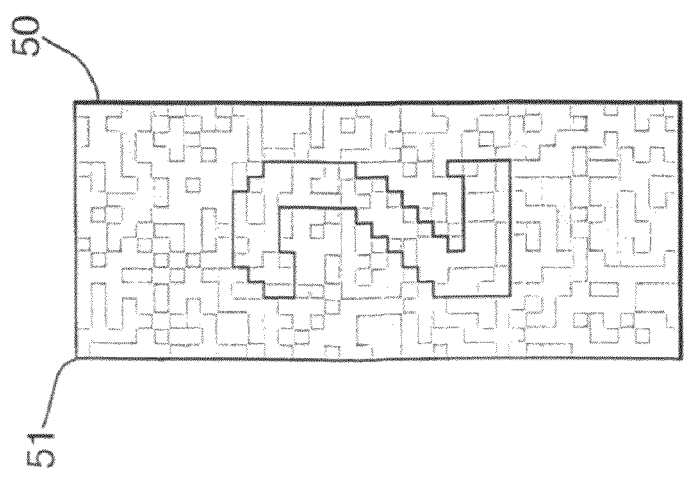

FIG. 6 shows an example of a device where the viewing regions comprise two areas, one which switches on viewing in transmitted light and one which doesn't. The viewing region is provided on one side with first and second patterns 50,51 defined by colour elements A (blue) and B (yellow) respectively forming one set of indicia and on the other side with third and fourth patterns 52,53 defined by colour elements A (yellow) and B (blue) forming a second different set of indicia. In this example the indicia comprise an apparently random array of pixels where each pixel is either coloured yellow or blue. The registration of the first and second indicia is such that in area 1 of the viewing region the two colours are present on both sides of the viewing region and the blue pixels in the first set of indicia overlaps with the yellow pixels in the second set of indicia and likewise the yellow pixels in the first set of indicia overlaps with the blue pixels in the second set of indicia. In area 2 of the viewing region the registration is such that blue pixels in the first set of indicia overlaps with the blue pixels in the second set of indicia and likewise the yellow in the first set of indicia overlaps with the yellow pixels in the second set of indicia.

The optical properties such as opacity of the ink used to form the first and second indicia are again selected such that when viewing the device in reflection from the front of the device the colours of the first indicia substantially conceals the colours of the second indicia. Alternatively an obscuring layer could be used between the first and second indicia. On viewing the device in reflection from the front (FIG. 6a) or rear side (FIG. 6b) of the device area 1 appears indistinguishable from area 2 and the authenticator observes an apparently random array of yellow and blue pixels. On viewing the device in transmission, from either side of the device, (FIG. 6c) area 1 switches from an apparently random array of yellow and blue pixels to a uniform green region resulting from the subtractive colour mixing of the perfectly registered blue and yellow pixels. In contrast area 2 appears the same in reflection and transmission and still comprises an apparently random area of blue and yellow pixels resulting from the fact that in area 2 every blue and yellow pixel on the front side is in perfect register with an equivalently coloured pixel on the reverse side. In this example area 1 defines the numeral "2" which is revealed on viewing in transmitted light due to it switching from a random two colour region which merges in with the background to a perceived single colour region which contrasts with the background.

Figure 7A:
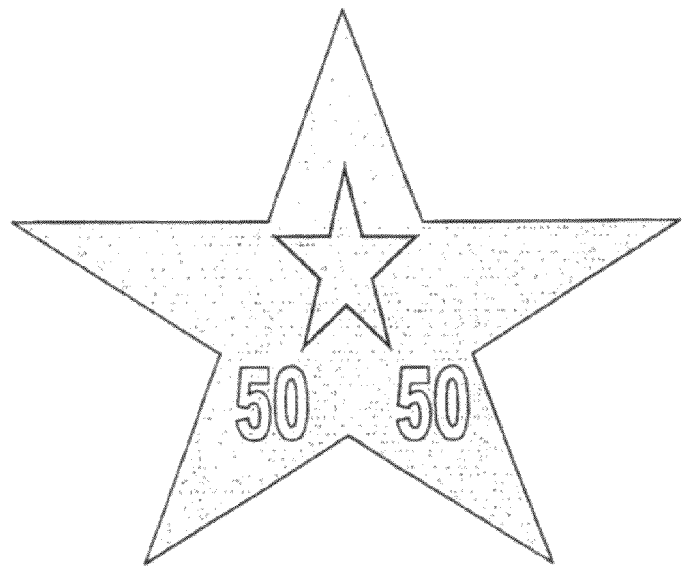
FIGS. 7a and 7b illustrate a seventh example when viewed in reflection and transmission respectively.
Figure 7B:
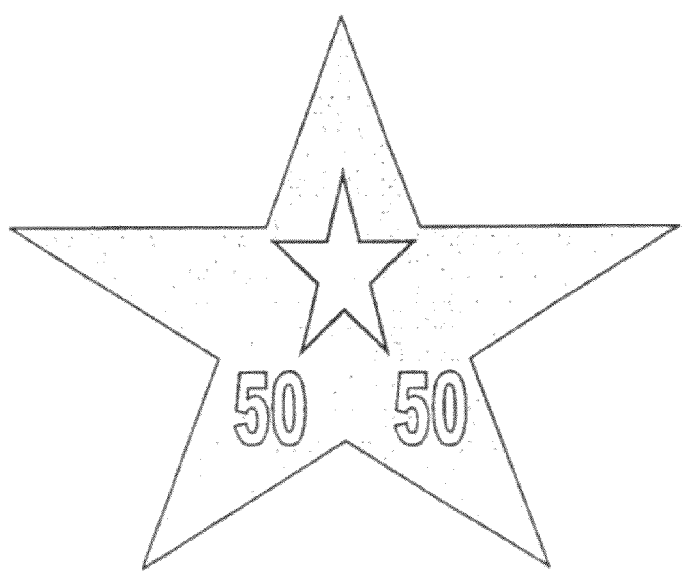

FIG. 7 schematically illustrates an example of a viewing region of the current invention comprising multiple localised areas that switch from being multi-coloured to a single colour, providing the disappearing effect, against a background that remains multi-coloured. In this example the viewing region itself defines an image in the form of a star and the first and second indicia comprise an apparently random array of pixels where each pixel is either coloured yellow or blue. On viewing the device in reflection, for example from the front (FIG. 7a) of the substrate, areas 1a, 1b and 1c appears indistinguishable from area 2 and the authenticator observes a star filled with an apparently random array of yellow and blue pixels. On viewing the device in transmission (FIG. 7b) areas 1a, 1b and 1c switch from an apparently random array of yellow and blue pixels to a uniform green colour resulting from the subtractive colour mixing of the perfectly registered blue and yellow pixels. Area 1a is in the form of a small star, and areas 1b and 1c are in the form of a numeral "50". In contrast area 2 appears the same in reflected and transmitted light and still comprises an apparently random area of blue and yellow pixels resulting from the fact that in area 2 every blue and yellow pixel on the front side is in perfect register with an equivalently coloured pixel on the reverse side. In this example the disappearance of the pixels in areas 1a, 1b and 1c on viewing in transmission is used to reveal multiple images thereby creating a security device which is striking and memorable to the authenticator.

In the examples in FIGS. 6 and 7 the individual image elements forming the indicia are pixels but the invention is not limited to pixels and any array of image elements can be employed typical examples include dots, polygons, lines, and any other geometric shape. As with the example in FIG. 3a third colour D can be introduced into the examples illustrated in FIGS. 6 and 7. In both case the indicia would then comprise an apparently random array of pixels where each pixel is either coloured yellow, blue or green, where in transmission the appearance of the green pixel would match the green colour resulting from the subtractive colour mixing of the yellow and blue pixels.

The apparently random pattern Used in the examples shown in FIGS. 6 and 7 can be generated in the form of a 2d matrix barcode such as a QR Code or Data Matrix code. Such 2D barcodes can be read by specialised readers or alternatively easily read by the general public using cameras within mobile phones or webcams. This would provide the security feature with an additional machine-readable component and further enhance its counterfeit resistance.

In a further example, and relevant to all of the embodiments of this invention, the indicia and/or resultant images of the current invention are associated with further indicia on either side of the secure document either within or adjacent to the viewing region. This increases the difficulty for counterfeiters to duplicate an item carrying the security device since they must associate the device with the further indicia. The further indicia can be provided using conventional inks such as coloured inks, white inks, black inks, metallic inks, optically variable inks (such as those incorporating thin film optical interference filters or liquid crystal pigment) and the like. Thermochromic inks, photochromic inks, magnetic inks, infrared absorbing inks and fluorescing and phosphorescing inks may also be employed. Alternatively the further indicia can be provided by metallised/demetallised designs, holographic designs, liquid crystal films or security embossings of transparent films.

FIG. 8 illustrates an example where the first and second indicia inside the viewing region are registered with a third indicia outside the viewing region. On the front side of the viewing region (FIG. 8a) the first indicia (first and second patterns) is printed in colours A, B and an additional third colour D to form a pictorial design. In this example colour A is magenta, colour B is cyan and colour D is blue. On the rear side of the viewing region (FIG. 8b) the second indicia (third and fourth patterns) is printed using colours A and B. The second indicia is the same as the first indicia apart from the fact that the region occupied by colour D in the first indicia is now colourless. The first and second indicia are applied in substantially perfect register such that the first indicia are directly superimposed on the second indicia. Further indicia 60 are printed on the front of the document and these are registered to the first and second indicia such that the pictorial design continues uninterrupted from the viewing region onto the document. The further indicia 60 may be in the same colours or different colours to the first and second indicia. On viewing the device in reflection from the front of the document (FIG. 8a) the image is seen in both the viewing region and on the document. When viewed in transmitted light (FIG. 8c), from the front of the document, the image in the viewing region disappears with the aperture now having a uniform blue appearance but the image on the document remains thereby highlighting the fact that the image in the aperture has disappeared.

Figure 9A:
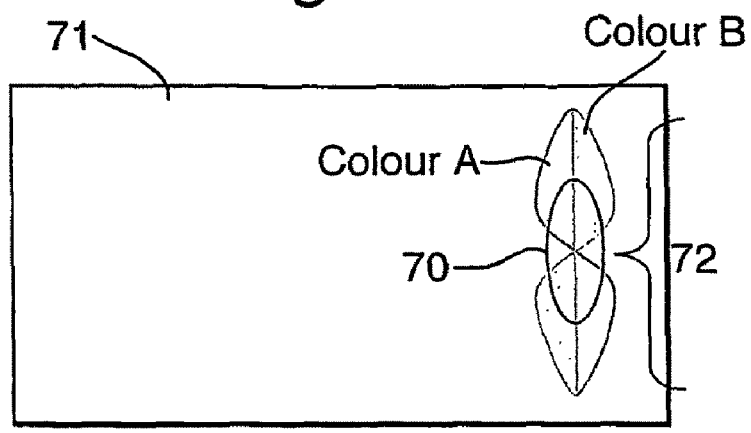
FIGS. 9a-9c are views similar to FIGS. 1a-1c but of a ninth example.
Figure 9B:
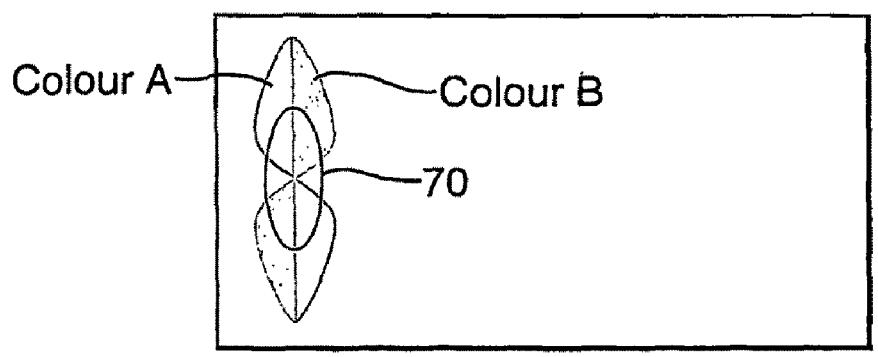
Figure 9C:
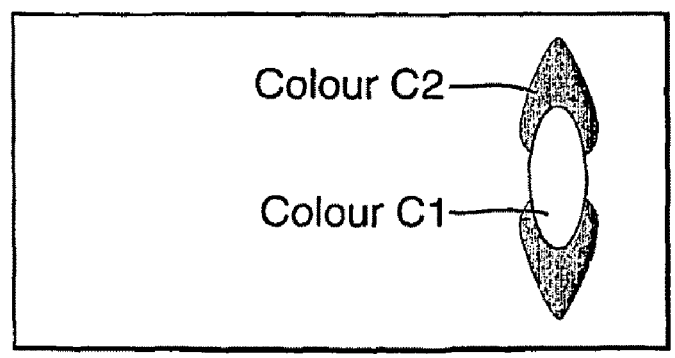

In a further example the substrate for the viewing region of the security device could comprise regions of different transparency. For example if the secure document comprised a transparent polymeric aperture 70 within a paper document 71 then the viewing region 72 could be formed over both the paper and the polymeric regions, as illustrated in FIG. 9. In FIG. 9 the first (FIG. 9a) and second (FIG. 9b) indicia are both printed in colours A (yellow) and B (blue) as before such that every colour A element of the first indicia is perfectly registered to every colour B element of the second indicia and every colour B element of the first indicia is perfectly registered to every colour A element of the second indicia. In this example the indicia form a pictorial design. On viewing the device in transmitted light subtractive colour mixing of colours A and B results in the viewing region switching to a single colour C which in this case is green. However because the transparency of the viewing region 72 is different for the paper region compared to the polymeric region the brightness of the green colours varies and the viewing region appears two tone (FIG. 9c) with a bright green (C1) being observed for the polymeric substrate and a darker green (C2) being observed for a paper substrate. The use of a substrate with different levels of transparency to generate a two tone colour image from the combination of the same colours provides an additional barrier to the counterfeiting of the security device.

Figure 10A:
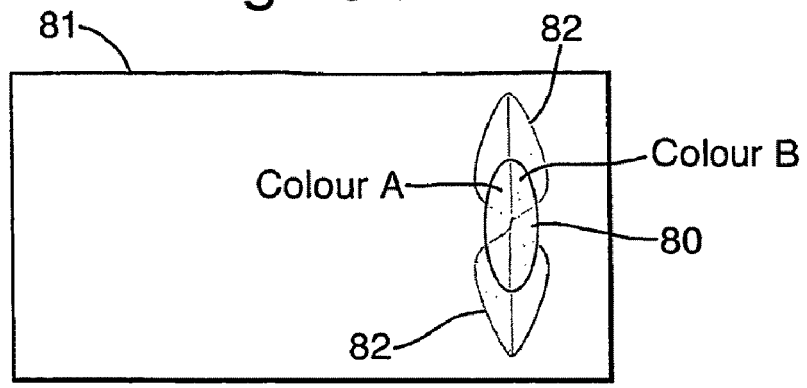
FIGS. 10a-10c are views similar to FIGS. 1a-1c but of a tenth example.
Figure 10B:
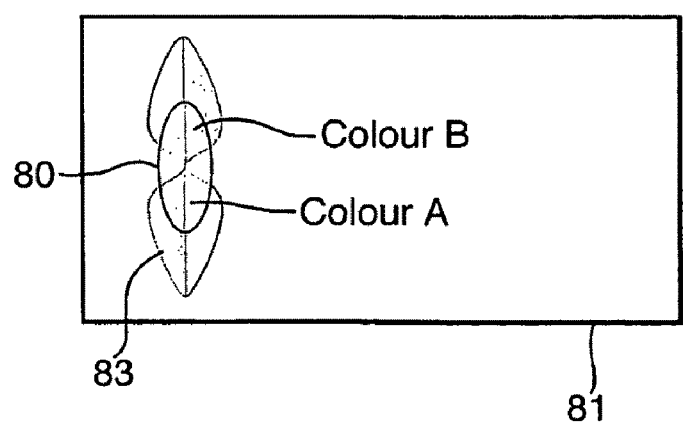
Figure 10C:
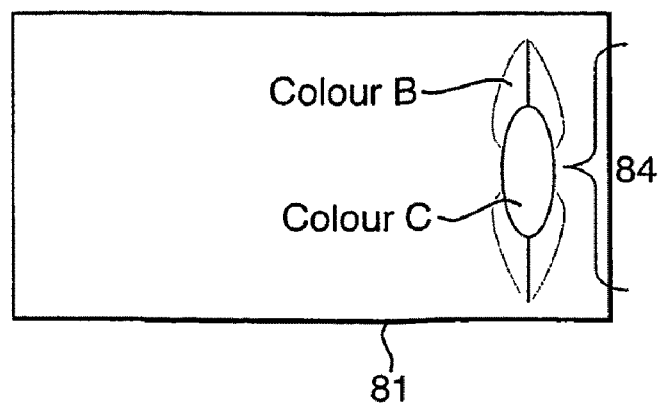

In a further example, the security device of the current invention can be combined with a conventional see-though feature commonly observed on banknotes. For example the secure document comprises a transparent polymeric viewing region 80 within a paper document 81, as illustrated in FIG. 10. In FIG. 10 the first (FIG. 10a) and second (FIG. 10b) indicia, positioned inside the transparent viewing region, are both printed in colours A (yellow) and B (blue) as before such that every colour A element of the first indicia is perfectly registered to every colour B element of the second indicia and every colour B element of the first indicia is perfectly registered to every colour A element of the second indicia. In this example the indicia form a pictorial design. The pictorial design is registered to a conventional see-through which adjoins the viewing region. The conventional see-through comprises regions 82 on the same side of the substrate as the first indicia and regions 83 on the same side of the substrate as the second indicia. Regions 82 and 83 are in the same colour as the second indicia, colour B (Blue). On viewing the device in transmitted light subtractive colour mixing of colours A and B results in the viewing region switching to a single colour C which in this case is green. The regions of the conventional see-through are precisely registered relative to one another such that when the document is held up to the light, the regions 83 on the back fit exactly into spaces within the regions 82 on the front forming an image which then combines with the viewing region 80 to form a complete image 84.

The inks used to form the first and/or second set of indicia may also contain functional components that react to an external stimulus. Components of this type include, but are not limited to, fluorescent, phosphorescent, infrared absorbing, thermochromic, photochromic, magnetic, electrochromic, conductive and piezochromic.

For example a fluorescent component can be added to the inks used to form the first and/or second set of indicia. Considering the security device illustrated in FIG. 1a fluorescent component is added to the ink of colour A such that when colour A is viewed under visible light illumination it sill appears cyan but when viewed under UV illumination it appears red. Similarly a fluorescent component is added to the ink of colour B such that when colour B is viewed under visible light illumination it sill appears magenta but when viewed under UV illumination it appears blue. This adds an additional security benefit in that the indicia appear in different colours when viewed under reflected UV light compared to when view under reflected visible light. Furthermore when viewed in transmitted UV light the indicia will disappear and be replaced with a single colour region, in this example magenta which is different from the blue colour observed in transmitted visible light.

In a further example, and in reference to the example in FIG. 1, a fluorescent component can be added to the inks used to form the first and/or second set of indicia such that when viewed in reflected visible light colour A is different from colour B (e.g. cyan and magenta) but when viewed in reflected UV light colour A is the same as colour B. This provides an additional security benefit to that already discussed in relation to FIG. 1, in that the image will disappear and be replaced with a single colour region under reflected UV light. The colour of the single colour region in reflected UV light may be the same or different than the colour of the single colour region in transmitted visible light.

Alternatively the inks used to form the first and/or second set of indicia may be selected such that when viewed in reflected visible light colour A is the same as colour B but when viewed in reflected UV light colour A is the different to colour B. In this example the security feature of the current invention can only be observed when viewing in reflected and transmitted UV light and its presence is not apparent in visible light.

Suitable inks which exhibit substantially the same visible appearance under first viewing conditions and different visible appearances under second viewing conditions are referenced in WO-A-2004050376.

The invention claimed is:

1. A security device comprising a substrate having a viewing region; a first pattern of a first colour and a second pattern of a second colour on one side of the viewing region; a third pattern of the first colour and a fourth pattern of the second colour on the other side of the viewing region, wherein the first and second patterns on the one side of the viewing region overlap the fourth and third patterns respectively on the other side of the viewing region to define respective first and second overlap regions, whereby
   a) when each side of the viewing region is viewed in reflected light, the patterns on that side can be distinguished by at least their colours, and
   b) when the viewing region is viewed in transmitted light, from either side of the substrate, the viewing region is sufficiently transparent that subtractive colour mixing between the overlapped first and fourth patterns of the first overlap region and between the overlapped second and third patterns of the second overlap region results in a perceived single resultant colour being visible for both first and second overlap regions.

2. A device according to claim 1, wherein the third pattern is superimposed on and in register with, the second pattern, and the fourth pattern is superimposed on and in register with, the first pattern.

3. A device according to claim 2, wherein the opposite first and fourth patterns are in perfect register, and the second and third patterns are in perfect register.

4. A device according to claim 1, wherein the patterns define solid areas of the respective colours.

5. A device according to claim 1, wherein the patterns define indicia.

6. A device according to claim 5, wherein the indicia comprise one or more of line patterns, fine filigree line patterns, dot structures, geometric patterns, alphanumeric characters, symbols or other indicia and the like.

7. A device according to claim 1, wherein the patterns define pseudo-random arrays of pixels in the respective colours.

8. A device according to claim 1, wherein when the security device is viewed in transmission, the resultant colour of the first and second overlap regions is formed in an image shape, such as an indicium, symbol, alphanumeric character or the like.

9. A device according to claim 1, wherein the patterns are printed on the substrate, for example by one of lithography, UV cured lithography, intaglio, letterpress, flexographic printing, gravure printing or screen-printing.

10. A device according to claim 1, wherein the patterns are provided using one or more of coloured inks, white inks, black inks, metallic inks, optically variable inks, fluorescent inks and the like.

11. A device according to claim 1, wherein at least one of the colours includes a reflective material such as metallic flakes.

12. A device according to claim 1, further comprising an obscuring layer between the first and second patterns on the one side and the third and fourth patterns on the other side to reduce visibility of the patterns on one side when the patterns on the other side are viewed in reflection, the obscuring layer allowing light to pass through the viewing region when the security device is viewed in transmission.

13. A device according to claim 12, wherein the obscuring layer comprises a vapour deposited metallic layer.

14. A device according to claim 13, wherein the metallic layer is partially demetallized.

15. A device according to claim 12, wherein the obscuring layer comprises a masking coat.

16. A device according to claim 12, wherein the obscuring layer is in the form of a screen.

17. A device according to claim 16, wherein the screen is regular or stochastic.

18. A device according to claim 16, wherein the coverage of the screen pattern is in the range 20-80%.

19. A device according to claim 18, wherein the coverage of the screen pattern is in the range of 40-70%.

20. A device according to claim 18, where in the coverage of the screen pattern is in the range of 50-70%.

21. A device according to claim 16, wherein the width of the lines or the diameter of the dots forming the screen are in the range 50-250 µm and spaces between the dots or lines are in the range 50-250 µm.

22. A device according to claim 16, wherein parts of the screen are filled to define an image such as indicia.

23. A device according to claim 16, wherein the screen is in the form of an array of dots or lines.

24. A device according to claim 1, comprising further indicia provided on one or both sides of the viewing region and in a colour corresponding to the said resultant colour.

25. A device according to claim 24, further comprising a colourless area on the other side of the viewing region in register with the further indicia.

26. A device according to claim 1, further comprising additional indicia on one side of the viewing region provided in a colour that renders said additional indicia visible under reflected and transmitted light.

27. A device according to claim 1, further comprising additional patterns in the first and second colours on the one side of the viewing region offset from the first and second patterns and provided in register with corresponding patterns on the other side of the viewing region such that elements of each of said additional patterns with the same colour on opposite sides of the viewing region are in register.

28. A device according to claim 1, wherein the transparency of the substrate varies over the viewing region.

29. A device according to claim 28, wherein the substrate varies from paper to polymer within the viewing region.

30. A device according to claim 1, wherein the substrate comprises a transparent polymer provided with an opacifying coating, the viewing region being defined by omitting the opacifying coating in a localised region.

31. A device according to claim 1, wherein the substrate is paper, the paper substrate having an aperture defining the viewing region within which is provided a polymer film.

32. A security document provided with a security device comprising a substrate having a viewing region; a first pattern of a first colour and a second pattern of a second colour on one side of the viewing region; a third pattern of the first colour and a fourth pattern of the second colour on the other side of the viewing region, wherein the first and second patterns on the one side of the viewing region overlap the fourth and third patterns respectively on the other side of the viewing region to define respective first and second overlap regions, whereby
   a) when each side of the viewing region is viewed in reflected light, the pattern on that side can be distinguished by at least their colours, and
   b) when the viewing region is viewed in transmitted light, from either side of the substrate, the viewing region is sufficiently transparent that subtractive colour mixing between the overlapped first and fourth patterns of the first overlap region and between the overlapped second and third patterns of the second overlap region results in a perceived single resultant colour being visible for both first and second overlap regions.

33. A security document according to claim 32, wherein the substrate of the security device is provided by the substrate of the security document.

34. A security document according to claim 32, wherein the security device is adhered to the substrate of the security document.

35. A security document according to claim 32, wherein one or more of the patterns of the security device are in register with an image provided elsewhere on the security document.

36. A security document according to claim 32, the security document being chosen from the group comprising banknotes, fiscal stamps, cheques, postal stamps, certificates of authenticity, articles used for brand protection, bonds, payment vouchers, and the like.

37. A method of manufacturing a security device, the method comprising providing a substrate having a viewing region; printing a first pattern of a first colour and a second pattern of a second colour on one side of the viewing region, and a third pattern of the first colour and a fourth pattern of the second colour on the other side of the viewing region, wherein the first and second patterns on the one side of the viewing region overlap the fourth and third patterns respectively on the other side of the viewing region to define respective first and second overlap regions, whereby
   a) when each side of the viewing region is viewed in reflected light, the patterns on that side can be distinguished by at least their colours, and
   b) when the viewing region is viewed in transmitted light, from either side of the substrate, the viewing region is sufficiently transparent that subtractive colour mixing between the overlapped first and fourth patterns of the first overlap region and between the overlapped second and third patterns of the second overlap region results in a perceived single resultant colour being visible for both first and second overlap regions.

38. A method according to claim 37, wherein the printing step is performed after the viewing region has been incorporated into the substrate.

39. A method according to claim 38 wherein the security device is a security document.

40. A method according to claim 37 wherein the security device is a security document.

* * * * *